United States Patent
Landa et al.

(10) Patent No.: US 6,916,583 B1
(45) Date of Patent: Jul. 12, 2005

(54) METHOD FOR PRODUCING HIGH GLOSS PRINTED IMAGES

(75) Inventors: Benzion Landa, Nes-Ziona (IL); Ishaiau Lior, Rehovot (IL); Itzhak Ashkenazi, Kfar-Gibton (IL); Avner Schneider, Nes-Ziona (IL)

(73) Assignee: Hewlett-Packard Indigo N.V., Ft. Collins, CO (US)

(*) Notice: Subject to any disclaimer, the term of this patent is extended or adjusted under 35 U.S.C. 154(b) by 0 days.

(21) Appl. No.: 10/182,979

(22) PCT Filed: Feb. 6, 2000

(86) PCT No.: PCT/IL00/00078

§ 371 (c)(1),
(2), (4) Date: Aug. 2, 2002

(87) PCT Pub. No.: WO01/56806

PCT Pub. Date: Aug. 9, 2001

(51) Int. Cl.⁷ .............................. G03C 3/00; B05D 3/12
(52) U.S. Cl. .............................. 430/11; 430/17; 430/18; 427/361; 427/365; 427/366; 427/391; 427/398.1; 347/106; 347/113; 264/175
(58) Field of Search .............................. 430/11, 17, 18; 427/361, 365, 366, 391, 398.1; 264/175; 347/106, 113

(56) References Cited

U.S. PATENT DOCUMENTS 5,155,604 A   10/1992   Miekka et al.
5,805,969 A   9/1998    Elsermans et al.
5,905,012 A   5/1999    De Meutter et al.
6,357,871 B1 * 3/2002   Ashida et al. .............. 347/106

FOREIGN PATENT DOCUMENTS

| EP | 0 758 766 | 2/1997 |
| EP | 0 768 577 | 4/1997 |
| WO | WO 94/29035 | 12/1994 |
| WO | WO 97/23356 | 7/1997 |
| WO | WO 01/51290 | 7/2001 |

OTHER PUBLICATIONS

Saxby, G.; "The Business of Embossing;" Feb. 22, 1990; British Journal of Photography, vol. 137, No. 6757; pp. 20–21; GB, Henry Greenwoodand Co.; London; XP000100045.

* cited by examiner

*Primary Examiner*—Thorl Chea
(74) *Attorney, Agent, or Firm*—Lee & Hayes, PLLC

(57) ABSTRACT

A method for printing an image on a surface of a substrate having a surface finish defined by a gloss, the method comprising: printing an image on the surface of the substrate, such that image areas thereof have a thickness, when fixed to the substrate and dry, of less than about 6 micrometers of a thermoplastic material; and smoothing the surface of at least a portion of the thermoplastic material.

40 Claims, 8 Drawing Sheets

METHOD FOR PRODUCING HIGH GLOSS PRINTED IMAGES

RELATED APPLICATIONS

The present application is a U.S. national application of PCT/IL00/00078, filed 6 Feb. 2000.

FIELD OF THE INVENTION

The invention relates to printing and in particular to producing printed images having a glossed finish.

BACKGROUND OF THE INVENTION

Glossing an image printed on a substrate generally improves the perceived quality of the image. Colors in the image are brighter and better defined after glossing and generally the overall impression of the image is more appealing. Glossing is therefore frequently used in the production of printed images.

A gloss finish can be imparted to an image printed on paper by calendering. In calendering, the paper with the printed image is passed through the nip of a highly polished chrome finished roller, hereinafter referred to as a "calendering roller", and a backing roller against which the calendering roller is pressed. (The backing roller may also be a calendering roller, if for example the paper is printed on both sides.) Calendering impresses the smooth surface finish of the calendering roller onto the colorants used to print the image, smoothing the surface of the colorants and giving them a gloss.

The final gloss of a printed image may be affected by the colorants used to print the image and the finish of the paper on which the image is printed. Whereas in general the gloss improves the perceived quality of the image, in some cases glossing results in undesirable "gloss contrast" between printed regions of the image and non-printed regions of the image. For example, when an image is printed on paper with conventional powder toner, a relatively thick layer of the toner is deposited on printed regions of the paper. If the image is glossed, the gloss of the toner is increased and all regions of the paper covered with toner acquire a high, substantially uniform gloss that is relatively independent of the gloss of the paper on which the image is printed. Non-printed regions of the paper are substantially unaffected by the glossing, and, if the paper gloss is low, can contrast substantially with the printed regions of the paper and reduce the perceived quality of the image. It should be noted that in some cases the printed toner is so thick that when fixed, pressure and hear applied to the image during fixing glosses the image.

Alternatively, and more conventionally images are glossed by coating the image with lacquer or varnish or laminating it with a film. These processes are complicated and expensive.

SUMMARY OF THE INVENTION

An aspect of some preferred embodiments of the present invention relates to providing a method for producing a glossed image printed on a substrate for which printed regions of the substrate have a gloss substantially the same as, or only moderately different from, non-printed regions of the substrate.

An aspect of some preferred embodiments of the present invention relates to providing a method of calendering a printed image.

In accordance with a preferred embodiment of the present invention an image is printed with toner on a suitable substrate so that printed regions of the substrate are covered with a relatively thin layer of toner, such as a layer of pigmented polymer formed by a liquid toner printing process. The layer is sufficiently thin so that contours of the toner layer follow and substantially replicate, rather than hide, contours of the surface of the substrate that characterize the roughness, and thereby the gloss, of the substrate. The image is then calendered.

The combination of printing an image with a suitably thin layer of toner that "hugs" the contours of the substrate on which the image is printed and calendering the image, in accordance with a preferred embodiment of the present invention, provides a relatively uniform gloss image. Printed regions of the substrate have a gloss substantially equal to or only moderately greater than the gloss of non-printed regions of the substrate for substantially any substrate roughness of the substrate commonly used in printing.

The present inventors have discovered that for an image printed with a thin "contour hugging" layer of toner, the gloss of the toner layer is a strong function of the roughness of the substrate that it covers. In particular, the increase in gloss of the printed portions provided by calendering is limited by the roughness of the substrate, which also is the major factor defining the gloss of the substrate.

For thin printed layers of toner, the toner layer replicates relatively accurately contours of the substrate. As a result the toner layer would have the same gloss as the substrate if the thickness of the layer were perfectly uniform and the surface of the layer perfectly smooth. However, generally, the thickness of the toner layer, even if it is firm forming, is not perfectly uniform and the surface of the layer is not perfectly smooth. The toner layer has a "natural roughness" (and corresponding natural gloss) of its own. The gloss of the toner layer is therefore not necessarily determined only by the roughness of the substrate that it covers.

For example, if an image is printed with "thin layer toner" on a high gloss substrate having a roughness substantially less than the natural roughness of the toner, the natural roughness of the toner dominates in determining the gloss of the toner layer. The toner layer will then have a gloss substantial y equal to the natural gloss of the toner and substantially less than the gloss of the substrate. Printed regions of the substrate will therefore have a gloss substantially less than non-printed regions of the substrate and the image will exhibit substantial gloss contrast.

If on the other hand the image is printed on a relatively low gloss matte substrate, having a roughness substantially greater than the natural roughness of the toner, the roughness of the substrate dominates in determining the gloss of the toner layer. In this case the toner layer will have substantially the same gloss as the substrate. Printed and non-printed regions of the substrate will have substantially the same gloss and the image will exhibit substantially uniform gloss.

It is thus seen that, while printing an image on a substrate with toner that forms a thin contour hugging layer on the substrate provides a uniform gloss image if the substrate is rough, it does not assure a uniform gloss image if the image is printed on a high gloss substrate. The present inventors have found however, that for suitable thicknesses of the thin toner layer, when calendering the layer, differences between the gloss of printed regions and non-printed regions of the substrate will be limited, irrespective of the roughness of the substrate.

If an image printed on a high gloss substrate is calendered, the calendering flattens and smoothes the toner layer at the peaks of the contours. The thickness of the toner layer is such (i.e. on the order of the depth of the furrows) that when the peaks are flattened and smoothed, sufficient quantities of toner are squeezed from the peaks to fill and/or decrease the size of furrows in the contours. In addition to "filling in furrows", calendering decreases the natural roughness of the toner surface. As a result, the smoothness of the toner layer is substantially increased. The gloss of the toner layer is thereby substantially increased and can be made to equal or exceed the gloss of the substrate. The image that might otherwise exhibit substantial gloss contrast, as a result of calendering, in accordance with a preferred embodiment of the present invention, exhibits relatively uniform gloss that varies from the gloss of the substrate by relatively small amounts. It should be understood that for very smooth papers, the furrows in the paper might be completely filled during fixing of the image to the paper.

On the other hand if the image is printed on a rough substrate, when the image is calendered, as in the case of the image being printed on the smooth substrate, the calendering flattens and smoothes the toner layer at the peaks of the contours. However, unlike in the case of the smooth substrate, because the toner layer is relatively thin compared to the depths and widths of the furrows, relatively little toner is pushed from the peaks into the furrows to fill the furrows. Therefore, after calendering, whereas the gloss of the toner layer is increased it is increased relatively moderately and the toner layer continues to substantially follow the contours of the rough substrate. Printed regions of the substrate have a somewhat higher gloss than non-printed regions of the substrate after the image is calendered. The difference in gloss is limited because the calendering only minimally fills in furrows in the substrate. As a result, the image has substantially uniform gloss that varies from the gloss of the substrate only moderately in different regions of the image. However, this limited increase in gloss does impart a perceived improvement in image quality to the image without causing an objectionable gloss contrast.

The inventors have found that toner layers preferably having a thickness of about one micrometer are suitable for practicing preferred embodiments of the present invention. A toner layer of about one micrometer replicates satisfactorily contours on surfaces of substrates having glosses that range from matte finished surfaces having roughness of 10 micrometers to high gloss finished surfaces having roughness of somewhat more than a micrometer. The thickness of the toner layer is sufficient so that for images printed on high gloss substrates, the toner layer can be smoothed by calendering so that its gloss can be made substantially equal to or moderately greater than the gloss of the substrate. Toners suitable for practicing preferred embodiments of the present invention are liquid toners manufactured by Indigo N. V., such as Electroink® III. Such images may be printed on E-Print®1000, Turbostream® or Omnius® printers of Indigo, N.V. However, the application of some aspects of the invention is not limited to these toners or printers and is generally applicable, at least in part, to any printing process that prints a thin (compared to the roughness of normal papers) pigment polymer image.

In accordance with some preferred embodiments of the present invention, in order to print a substantially uniform gloss image on a substrate using toner, regions of the substrate that are not printed with a portion of the image are printed with a transparent toner, having substantially a same thickness as the pigmented toner. As a result, a substantially uniform thickness layer of toner covers all regions of the substrate on which the image is printed. When calendered, all regions of the substrate are glossed to a substantially same degree and undesirable gloss contrast in the image is avoided. These preferred embodiments of the invention include printing with thin toners, such as the liquid toners described above (in which case the gloss will be only somewhat higher than that of the paper on which they are printed) or with thick toners, such as powder toners (in which case the gloss may be much higher than that of the substrate).

In accordance with some preferred embodiments of the present invention, in order to provide a uniform gloss image printed on a substrate with toner, the substrate is first coated with a layer of thermoplastic. This forms a relatively smooth printing surface. The image is then printed with, preferably, a toner that forms a relatively thin toner layer on regions of the substrate on which it is printed. When the image is calendered, thermoplastic in non-printed regions of the substrate reacts to the calendering similarly to the way toner reacts to the calendering. The thermoplastic in non-printed regions of the substrate is smoothed and glossed to substantially the same extent that toner in the printed regions of the substrate is glossed.

It should be noted that using the last two methods of providing a uniform gloss printed image does not necessarily provide the image with a gloss close to the gloss of the substrate on which it is printed. By determining the thickness of the toner layers and/or thermoplastic coating such that they are substantially thicker than the average depth of furrows (as for example, printing with powder toner) in the substrate surface the final gloss of the image is substantially independent of the roughness and thereby the gloss of the substrate.

In accordance with a preferred embodiment of the present invention, an image printed with toner is calendered by heating the image to a temperature at which the toner becomes plastic and calendering the image using a calendering roller cooled to a temperature substantially below the softening temperature of the toner. When a region of the image passes through a nip between the calendering roller and a backing roller, the heated toner in the region is smoothed and rapidly cooled as the calendering roller absorbs heat from the toner. The rapid cooling "freezes" the smooth finish impressed on the toner by the calendering roller and prevents reflow of the toner as the region exits the nip. In addition, the cooling reduces disturbing of the surface of the toner caused by toner sticking to the surface of the calendering roller. Preferably a very smooth hard metal roller is used. Preferably, the toner is allowed to remain in contact with the calendering roller even beyond the nip, to allow the toner to further harden prior to its removal.

An aspect of some preferred embodiments of the present invention relates to producing a hologram on a printed layer of toner. In accordance with a preferred embodiment of the present invention a hologram is produced on a substrate by printing a layer of toner on the substrate and embossing the printed toner with a pattern of ridges that generates a holographic image. Embossing the toner layer is preferably performed using a method similar to a method by which a toner image is calendered in accordance with a preferred embodiment of the present invention. The pattern of ridges is etched onto a roller, hereinafter referred to as an "embossing roller". The substrate with the printed toner layer is passed through a nip between the embossing roller and a suitable backing roller. As the substrate passes through the nip, the pattern of ridges is embossed into the toner layer. Preferably, the toner is heated to a temperature at which it becomes plastic and the embossing roller is cooled to a temperature substantially below the "plastic" temperature. Typically, hologram ridges have a submicrometer height. In order to assure satisfactory embossing of the hologram pattern, preferably, toner layers in the image are at least one micrometer thick. Preferably, the substrate on which the image is printed is a smooth high gloss substrate that has a roughness of about one micrometer or less. Alternatively the toner is a toner that form a layer on the substrate sufficiently thick so that during the embossing process the toner fills in furrows on the surface of the substrate.

In some preferred embodiments of the present invention the toner layer is printed so that it covers only limited regions of the substrate areas of which are intended to be embossed with a hologram ridge pattern. In some preferred embodiments of the present invention the toner layer comprises a desired image having localized regions intended for embossing with a hologram ridge pattern.

In some preferred embodiments of the present invention, to increase the reflectivity of toner that is to be embossed with a hologram ridge pattern, thin flakes of reflective material, such as for example thin metallic or mica flakes that reflect light strongly, are added to the toner. When the toner is printed and fixed to the substrate, the flakes become oriented substantially parallel to the substrate surface. When embossed with the hologram pattern, the reflectivity of the embossed toner layer is higher than it would be without the addition of the reflective material. In some preferred embodiments of the present invention the toner is dusted with a reflecting powder prior to the embossing of the pattern, to make the toner highly reflective. In some preferred embodiments of the present invention, the toner layer is made highly reflective by foil laminating the toner and covering it thereby with a highly reflective metal coating. Such a process is described in PCT patent application PCT/IL00/00018, the disclosure of which is incorporated herein by reference.

Embossing holograms on suitable thermoplastic layers covering appropriate substrates is known. However, prior art methods generally involve extruding a thermoplastic layer onto a substrate. These methods produce a uniform thermoplastic layer that covers substantially all the surface of the substrate to which the thermoplastic is applied. As a result, the prior art methods do not allow for coating only a portion of the substrate with thermoplastic, so that the rest of the substrate can be easily printed or written on. Methods for embossing substrates with a hologram are described in U.S. Pat. No. 5,155,604 to R. G. Miekka et al, the disclosure of which is incorporated herein by reference.

There is thus provided, in accordance with a preferred embodiment of the invention, a method for printing an image on a surface of a substrate having a surface finish defined by a gloss, the method comprising:

printing an image on the surface of the substrate, such that image areas thereof have a thickness, when fixed to the substrate and dry, of less than about 6 micrometers of a thermoplastic material; and smoothing the surface of at least a portion of the thermoplastic material.

Preferably, printed portions of the image have a thickness of less than about 4 micrometers, more preferably about 3 micrometers and less than about 2 micrometers.

In a preferred embodiment of the invention, printing the image comprises printing the image with a composition of matter comprising a thermoplastic material in a carrier liquid There is further provided, in accordance with a preferred embodiment of the invention, a method for printing an image on a surface of a substrate having a surface finish defined by a gloss, the method comprising:

printing an image on the surface of the substrate utilizing a composition of matter comprising a thermoplastic material in a carrier liquid;

fixing the thermoplastic material to the surface of the substrate; and smoothing the surface of at least a portion of the thermoplastic material.

Preferably, the printed areas of the image form a layer of toner thinner than the roughness of the surface of the substrate.

In a preferred embodiment of the invention, smoothing comprises;

heating the image to a temperature at which the thermoplastic material softens; and passing the substrate through a nip formed by a smooth hard roller and another surface.

Preferably, the image is substantially free of carrier liquid during said smoothing.

Preferably, smoothing comprises:

passing the substrate through a nip formed by a smooth hard roller, heated to a temperature at which the substrate softens, and another surface.

In a preferred embodiment of the invention, the thickness of the printed areas of the image is such that only a portion of the thermoplastic material is situated above peaks of the roughness of the surface of the substrate. Preferably, the smoothing smoothes substantially only the portion of the thermoplastic material situated above the peaks.

In a preferred embodiment of the invention, the substrate is paper.

In a preferred embodiment of the invention, printing comprises printing utilizing a liquid toner.

Preferably, the thermoplastic material forms a film prior to the smoothing.

Preferably, the thermoplastic material is colored with a colorant. Preferably, the colorant is a pigment.

There is further provided, in accordance with a preferred embodiment of the invention a method for printing a substantially uniform gloss image on a substrate comprising:

printing the image on a surface of the substrate using pigmented toner that forms a toner layer on regions of the surface on which it is printed; and printing at least regions of the surface of the substrate that are not printed with portions of the image, with a transparent toner that forms a layer on regions of the surface of the substrate on which the transparent toner is printed.

In a preferred embodiment of the invention, the transparent toner is printed only on portions of the surface of the substrate that are not printed with pigmented toner. Preferably, the transparent toner has substantially a same thickness as the pigmented toner.

Preferably, the transparent toner is plastic at substantially the same temperature as the pigmented toner.

There is further provided, in accordance with a preferred embodiment of the invention, a method for printing a substantially uniform gloss image on a surface of a substrate using toner comprising:

applying a layer of thermoplastic material to the substrate surface that covers substantially the entire surface of the substrate, which layer is plastic at a temperature at which the toner is plastic;

printing the image on the thermoplastic layer using the toner; and calendering the image at an image temperature at which both the image and thermoplastic layer are plastic.

Preferably, applying a layer of thermoplastic comprises printing a layer of toner of a same type as the toner used to print the image.

There is further provided, in accordance with a preferred embodiment of the invention, a method of calendering an image printed on a substrate comprising:

providing a image comprising a thermoplastic colored material, fixed to a substrate and cooled to a temperature below a temperature at which the material is plastic;

heating the image to a temperature at which the material becomes plastic; and passing the image through a nip between a smooth hard roller, at a temperature below that at which the material becomes plastic, and another surface against which the roller is pressed.

Preferably the method includes continuing contact between the material to the roller after the substrate leaves the nip to allow the material to cool.

Preferably, the material is cooled to a temperature at which it is not plastic prior to its removal from contact with the smooth hard roller.

Preferably, the another surface is the surface of a hard roller.

Preferably, the material comprises a thermoplastic toner material.

There is further provided, in accordance with a preferred embodiment of the invention, a method for producing a hologram comprising:

printing a layer of thermoplastic material on a surface of a substrate; and embossing the printed layer with a ridge pattern that produces the hologram.

Preferably, printing a layer of thermoplastic material comprises printing a layer of toner.

Preferably, the thermoplastic layer comprises reflective material dispersed therein.

Preferably, the thermoplastic material is coated with powder or foil of reflective material.

In a preferred embodiment of the invention, the method includes laminating the thermoplastic layer with a reflective foil prior to the embossing. Preferably, laminating comprises laminating only a portion of the thermoplastic layer.

In a preferred embodiment of the invention, printing a layer of thermoplastic material comprises printing the thermoplastic layer on only a portion of the substrate surface.

In a preferred embodiment of the invention, embossing a hologram ridge pattern comprises embossing the ridge pattern on only a portion of the thermoplastic layer.

BRIEF DESCRIPTION OF FIGURES

The invention will be more clearly understood from the following description of preferred embodiments thereof read with reference to figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

DESCRIPTION OF PREFERRED EMBODIMENTS

In the descriptions of preferred embodiments below it is assumed for convenience of presentation that substrates on which images are printed are paper. However, the practice of the invention is not limited to printing on paper and substrates other than paper can be used to print images in accordance with preferred embodiments of the present invention.

Figure 1:
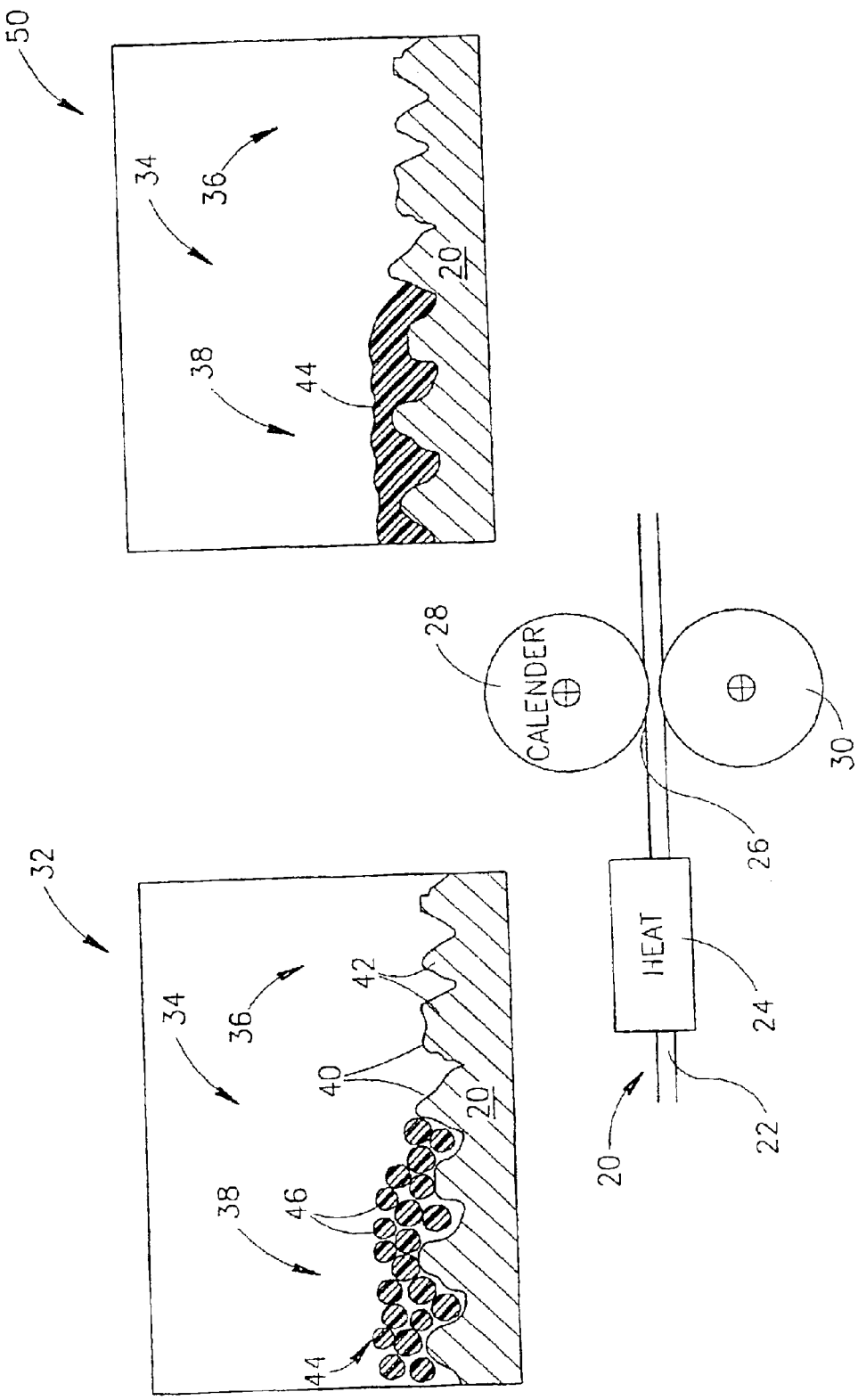
FIG. 1 schematically shows calendering an image printed on rough, matte paper in accordance with prior art and a magnified cross sectional view of a region of the image before and after calendering.

FIG. 1 schematically shows in cross-sectional view an image 20 printed on relatively rough matte finished paper 22 with conventional dry toner being glossed by calendering, in accordance with prior art. In the calendering process image 20 is heated at a heating station, represented by a rectangle 24, using methods known in the art to a temperature at which the toner with which it is printed becomes plastic. After heating, the image passes through a nip 26 between a calendering roller 28 and a backing roller 30. Such heating may be the final fixing step of the process of printing the image.

Inset 32 shows a magnified cross sectional view of a surface area 34 of paper 22 before calendering that comprises a region 36 which is printed with a portion of image 20 and a region 38 that is not printed. Contours on surface 38 comprise peaks 40 and furrows 42 that characterize the roughness of surface 38. Peaks 40 and furrows 42 are shown as relatively pronounced, indicating the matte finish of surface area 34. The depth and width of furrows 42 range from 7–10 micrometers for matte finished paper.

Printed region 36 of surface 34 is covered with a layer 44 of fused dry toner particles 46 that has a thickness equal to or greater than the average depth of furrows 42. For dry toner, dimensions of toner particles range from 5–15 micrometers and toner layer 44 has a thickness that ranges similarly from about 6 or more micrometers to about 15 micrometers.

Inset 50 shows a cross sectional view of surface area 34 after calendering. Toner layer 44 in region 36 is substantially smoothed by the calendering and has acquired a relatively high gloss. Non-printed region 38 of surface 34 however is substantially unaffected by the calendering and has maintained it original roughness and matte finish. As a result, in surface area 34, image 20 exhibits large gloss contrast that detracts from the perceived quality of the image.

Figure 2A:
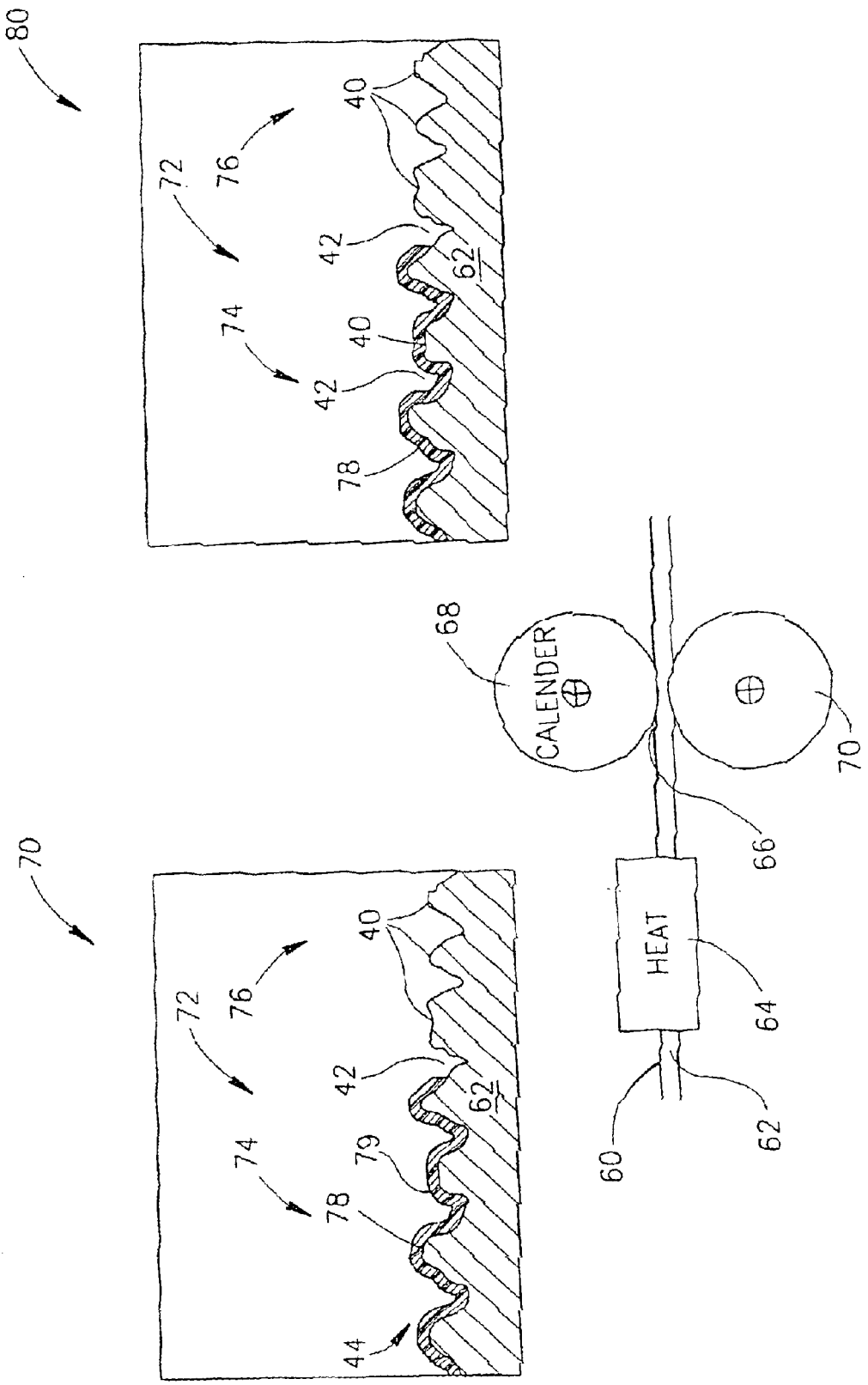
FIGS. 2A and 2B schematically show glossing an image printed on matte and on glossy paper respectively by calendering, in accordance with a preferred embodiment of the present invention, and magnified cross sectional views of regions of the image before and after calendering.

FIG. 2A schematically shows in cross-sectional view an image 60 printed on rough, matte finished paper 62 with a toner that forms a relatively thin layer on regions of substrate on which it is printed being glossed by calendering, in accordance with a preferred embodiment of the present invention. Matte finished paper 62 has a same roughness as that of matte finished paper 20 shown in FIG. 1.

In the calendering process, image 60 is heated at a heating station 64 to a temperature at which the toner with which it is printed becomes plastic using methods known in the art. The heated image passes through a nip 66 between a calendering roller 68 and a backing roller 70.

Calendering roller 68 is initially at a temperature that is preferably substantially less than the temperature at which the toner becomes plastic. As a region of image 60 passes through nip 66, calendering roller 68 absorbs heat from the toner in the region and the toner cools rapidly to a temperature preferably below the temperature at which it is plastic while still in contact with calendering roller 68. As a result, toner reflow and dimpling of the toner surface resulting from localized adhesion of toner to calendering roller 68 are substantially reduced.

Inset 70 shows a magnified cross sectional view of a surface area 72 of paper 62 before being calendered that comprises a region 74 printed with a portion of image 60 and a non-printed region 76. Surface contours of matte finished paper 62 are characterized by relatively pronounced peaks 40 and furrows 42, as are the surface contours of matte finished paper 20 shown in FIG. 1.

In accordance with a preferred embodiment of the present invention, the toner that is printed on region 74 covers the region with a relatively thin layer 78 of fused toner particles that has a surface 79. The thickness of toner layer 78 is substantially smaller than the average depth and width of furrows 42 and toner layer 78 closely follows the contours of surface 72, hugging peaks 40 and furrows 42 that characterize the roughness of surface 72. Non-uniformities in the thickness of toner layer 78 and imperfections in surface 79 of toner layer 78 are relatively small compared to the average depth of furrows 42 and do not substantially affect the accuracy with which surface 79 replicates the contours of surface 72. The gloss of toner layer 78 in printed region 74 is therefore substantially the same as the gloss of paper 62 in non-printed region 76.

Inset 80 shows a magnified cross sectional view of surface area 72 after calendering in accordance with a preferred embodiment of the present invention. Because toner layer 78 is so thin, the calendering flattens and smoothes only regions of toner layer 78 that lie on peaks 40 of surface 72. In the flattening and smoothing of toner on a peak 40 a relatively small quantity of toner in toner layer 78 is pushed off the peak into furrows 42 on either side of the peak. As a result, after calendering, toner layer 78 away from the peaks is relatively unaffected by the calendering and surface 79 continues to follow accurately contours of surface 72. Whereas the gloss of toner layer 78 is slightly increased by the flattening and smoothing of toner on peaks 40 it remains relatively close to the gloss of non-printed region 76 of surface 72. The present inventors have found that the increased gloss of the image portions, although it leads to gloss contrast, increases the perceived quality of the image, so long as the image contrast is limited. Preferably, the gloss contrast should be limited to no more than 10–30%, more preferably to no more than 20%.

Figure 2B:
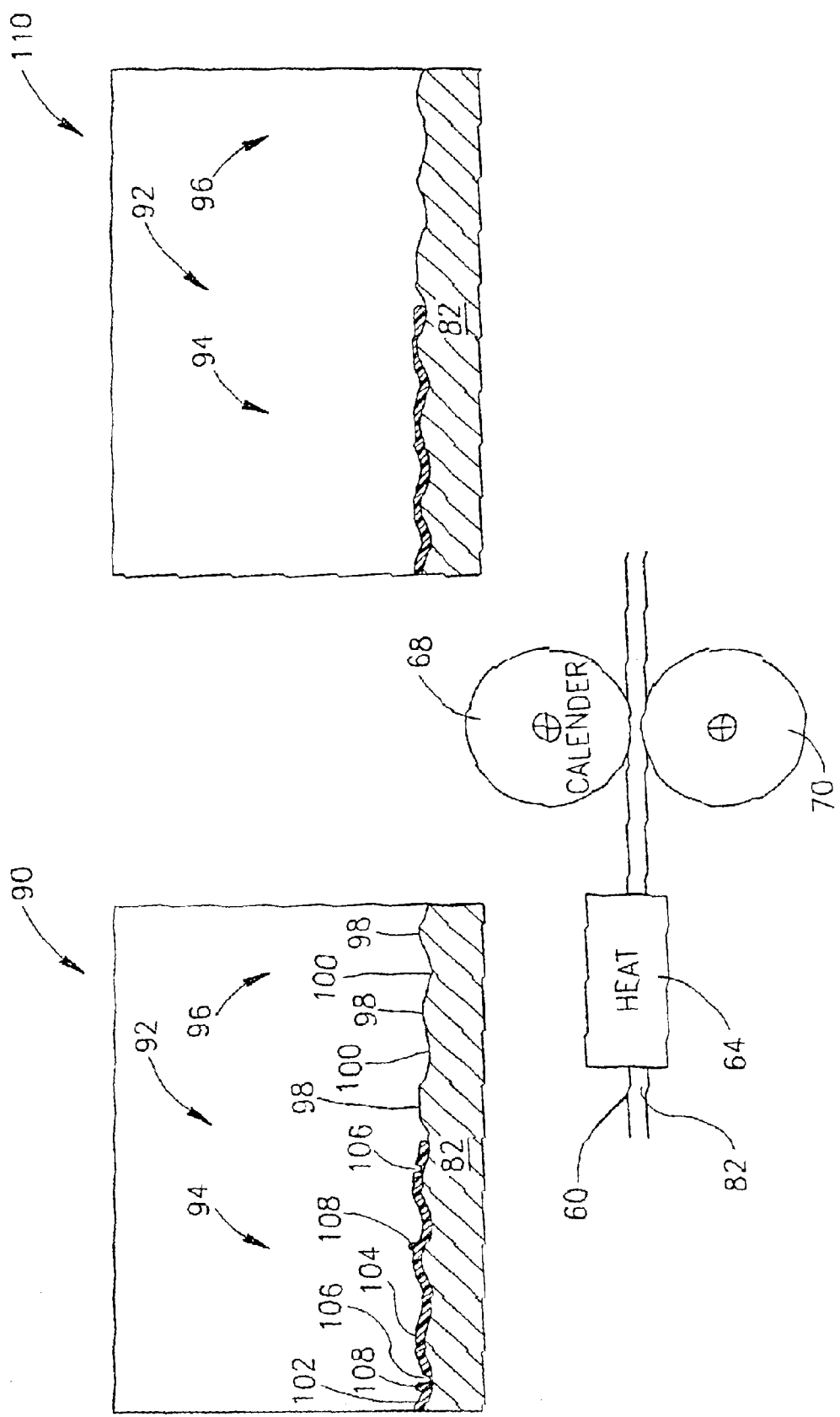

FIG. 2B schematically shows in cross-sectional view, image 60 printed on relatively more glossy paper 82 with the same toner used to print image 60 on matte paper 62, being glossed by calendering, in accordance with a preferred embodiment of the present invention. Calendering image 60 printed on glossy paper 82, in accordance with a preferred embodiment of the present invention, has a substantially different effect on the gloss of toner in the image than the effect that calendering has on the gloss of toner in image 60 printed on matte paper 62.

Inset 90 in FIG. 2B shows a magnified cross sectional view of a surface area 92 of glossy paper 82 before being calendered that comprises a region 94 printed with a portion of image 60 and a non-printed region 96. Glossy paper 82 is relatively smooth and is characterized by peaks 98 and furrows 100 that are substantially moderated in comparison to peaks 40 and furrows 42 of surface 72 of matte paper 62 shown in FIG. 2A.

As in the case in which image 60 is printed on matte paper 62, in accordance with a preferred embodiment of the present invention, printed region 94 of surface 92 is covered with a relatively thin layer 102 of fused toner. Toner layer 102 has a surface 104 that closely follows the contours of surface 92. If the thickness of toner layer 102 were perfectly uniform and surface 104 perfectly smooth, toner layer 102 would have the same gloss as paper 82. However, the thickness of toner layer 102 is not perfectly uniform and surface 104 is not perfectly smooth, as indicated, schematically, by pockmarks 106 and dimples 108 on surface 104. The gloss of toner layer 102 is therefore generally less than the gloss of paper 82. For example, if paper 82 has a gloss of 90%, toner layer 102 might have a gloss of 60%, depending upon the characteristics of the toner used to print image 60.

Whereas, similar imperfections also exist in toner layer 78 printed on matte paper 62, the size of the imperfections, as noted above, are relatively small compared to the average depth of furrows 42 that characterize the roughness of matte paper 62. The imperfections in toner layer 78 therefore do not substantially affect the gloss of toner layer 78. However, for smooth, high gloss surface 92, the imperfections in toner layer 104 are not negligible compared to the depths of furrows 100 characterizing the roughness of surface 92. Therefore, for high gloss paper 82, the imperfections reduce the gloss of toner layer 104 below that which would be expected if the gloss of the toner layer were determined mainly by the gloss of paper 82.

Inset 110 shows a magnified cross sectional view of surface area 92 after calendering. Calendering has flattened toner layer 102 at and near peaks 98 similarly to the manner in which calendering flattened and smoothed toner layer 78 in FIG. 2A. However, unlike in FIG. 2A, the thickness of toner layer 102 is substantially thicker relative to the average depth of furrows 100 than is the thickness of toner layer 78 relative to the average depth of furrows 100. Therefore, when image 60 is calendered, sufficient quantities of material from toner layer 102 are moved off peaks 98 to fill in furrows 100. In addition, pockmarks 106 and dimples 108 shown in inset 90 tend to be smoothed out by the calendering. As a result, as shown in inset 110, calendering substantially increases the overall smoothness and thereby the gloss of toner layer 102. Preferably, calendering temperatures, pressure and angle at which image 60 is calendered are controlled so that the gloss of toner layer 102 after calendering is substantially equal to or moderately greater than the gloss of glossy paper 96 (i.e. the gloss of non-printed region 96).

The inventors have found that toner layers 78 and 102 are generally about one micrometer thick, and may be between 0.5 and 4 micrometers thick. A one micrometer thick toner layer replicates satisfactorily contours on surfaces of substrates having glosses that range from matte finished surfaces having roughness of 10 micrometers to high gloss finished surfaces having roughness of about a micrometer. Furthermore a one micrometer toner layer when printed on smooth high gloss paper can be smoothed sufficiently to acquire a gloss substantially equal to or greater than the gloss of the paper. For example if toner layer 102 (FIG. 2B) is one micrometer thick it can be calendered to substantially fill in furrows 100. The inventors have found that liquid toners manufactured by Indigo, such as Electroink m, have characteristics that make them suitable for practicing the present invention. Preferably, the liquid toner is Electroink III.

Figure 3A:
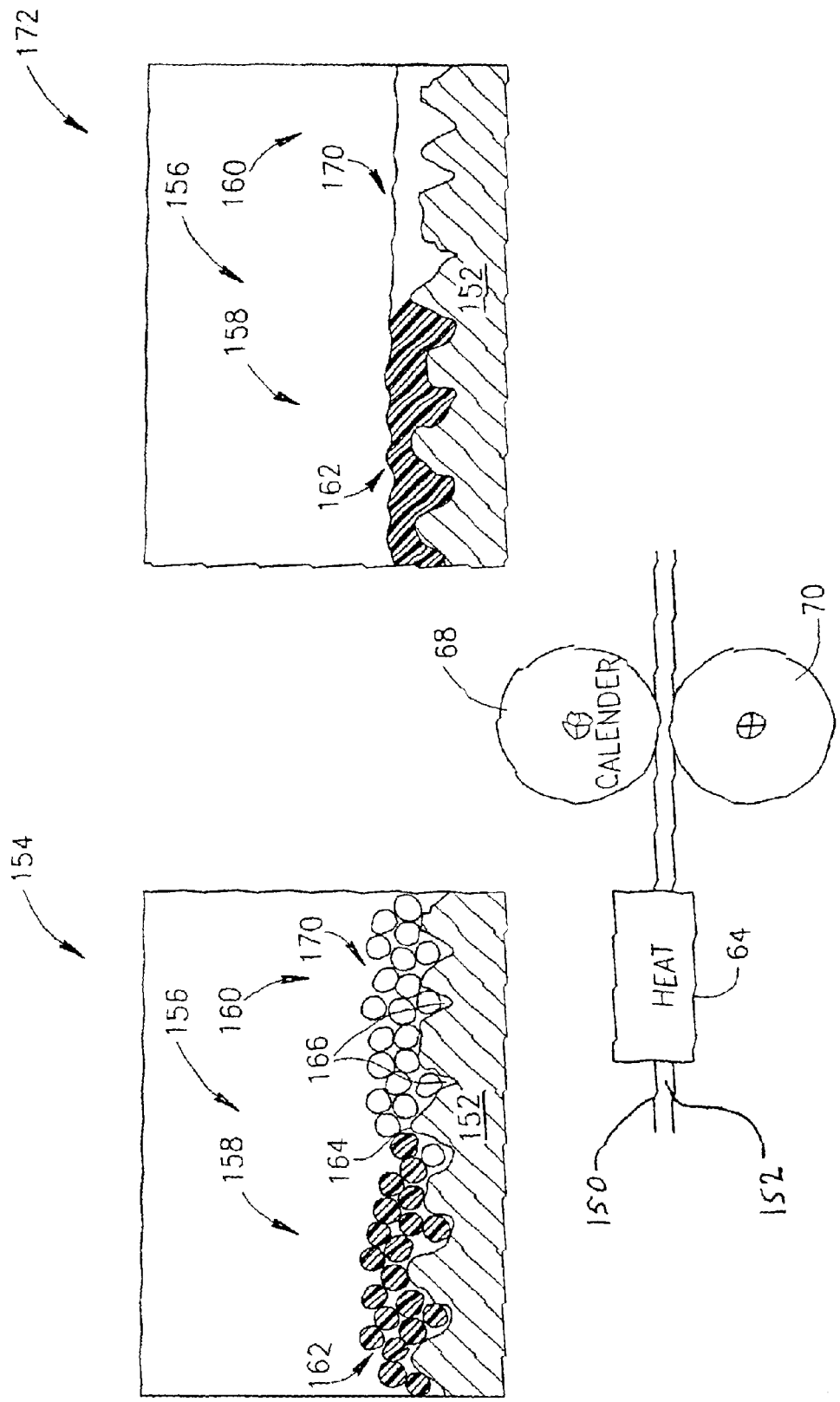
FIG. 3A schematically shows calendering an image printed on paper in which regions of the paper that are not printed with a portion of the image are printed with transparent toner, in accordance with a preferred embodiment of the present invention.

FIG. 3A schematically shows calendering an image 150 printed on paper 152 using toner in which regions of the paper that are not printed with a portion of the image are printed with transparent toner, in accordance with a preferred embodiment of the present invention In printing image 150, as in printing many images, surface regions of paper 152 are printed with portions of image 150 and surface region are not printed. In prior art regions of paper that are not printed with a portion of an image, are left bare. An inset 154 shows a magnified cross section view of a surface area 156 of paper 152 before calendering. A region 158 of surface 156 is a region of paper 152 that is printed with a portion of image 150 and is shown covered with a layer 162 of fused toner particles (by way of example toner layer 162 is shown as formed from relatively large dry toner particles). A region 160 of surface 156 is a region of paper 152 that is not printed with a portion of image 150, which would in prior art be left as a surface region of bare exposed paper. Paper 152 is shown by way of example as having a relatively matte low gloss finish and is shown with pronounced peaks 164 and furrows 166. If surface 156 is calendered with region 160 bare, as in prior art, toner layer 162 on region 158 would acquire a high gloss while region 160 would remain with the matte low gloss finish of paper 156. Image 150 would then exhibit undesirable gloss contrast as noted in the discussion of FIG. 1.

In accordance with a preferred embodiment of the present invention, region 160 is not left bare but is printed with transparent toner and is covered with a layer 170 of transparent fused toner, which by way of example is shown as dry toner in FIG. 3A. As a result, after calendering, both regions 158 and 160 will acquire substantially a same gloss. An inset 172 shows surface 156 after calendering in which toner layer 162, which covers printed region 158 and transparent toner layer 170 which covers non-printed region 160 are smoothed by the calendering to the same degree and have acquired thereby a same gloss, in accordance with a preferred embodiment of the present invention.

Figure 3B:
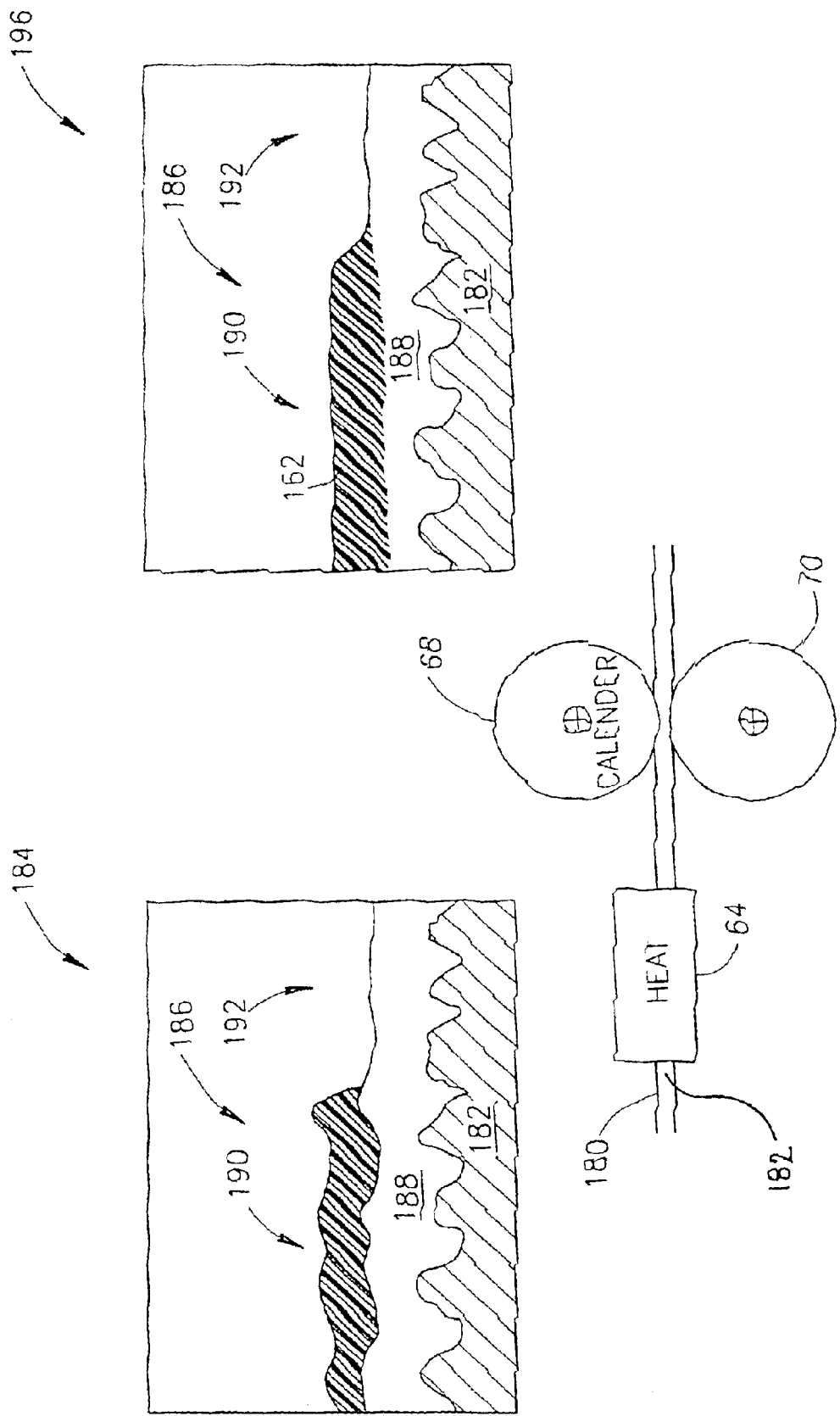
FIG. 3B shows schematically a magnified cross sectional view of a region of an image printed on paper that is coated with a thermoplastic coating so that all regions of the image have substantially a same gloss, in accordance with a preferred embodiment of the present invention.

FIG. 3B schematically illustrates another method, in accordance with a preferred embodiment of the present invention, for producing printed images for which printed and non-printed regions of paper on which the images are printed have a substantially same gloss. FIG. 3B schematically shows an image 180 printed on paper 182 being calendered, in which the paper is coated with a layer of preferably transparent material, which after calendering acquires a same gloss as that of colorants used to print the image. As a result image 180 after calendering has substantially uniform gloss.

An inset 184 shows a magnified cross section of a surface region 186 of paper 182 prior to calendering. Paper 182 is shown by way of example as having a rough matte finish. Preferably, image 180 is printed with toner and paper 182 is covered with a layer 188 of thermoplastic material that becomes plastic at a same temperature at which the toner becomes plastic. Preferably, at the temperature at which the toner and thermoplastic become plastic, the toner and thermoplastic have substantially a same viscosity.

A region 190 of surface 186 is printed with a portion of image 180 and a region 192 of surface 186 is not printed. Printed region 190 is covered with a layer 194 of fused toner used to print image 180. Preferably toner layer 194 is relatively thin. Preferably the toner used to print image 180 is Electroink II or Electroink III. Preferably, thermoplastic layer 188 comprises the same polymer as used for the toner particles. It may be applied, for example, by preprinting a continuous layer of preferably transparent toner of the same type as that used to produce the colored part of the image. An inset 196 shows surface area 186 after calendering. Both printed region 190 and non-printed region 192 of surface 186 are smoothed by the calendering to substantially a same degree and have acquired a substantially same gloss.

Figure 4A:
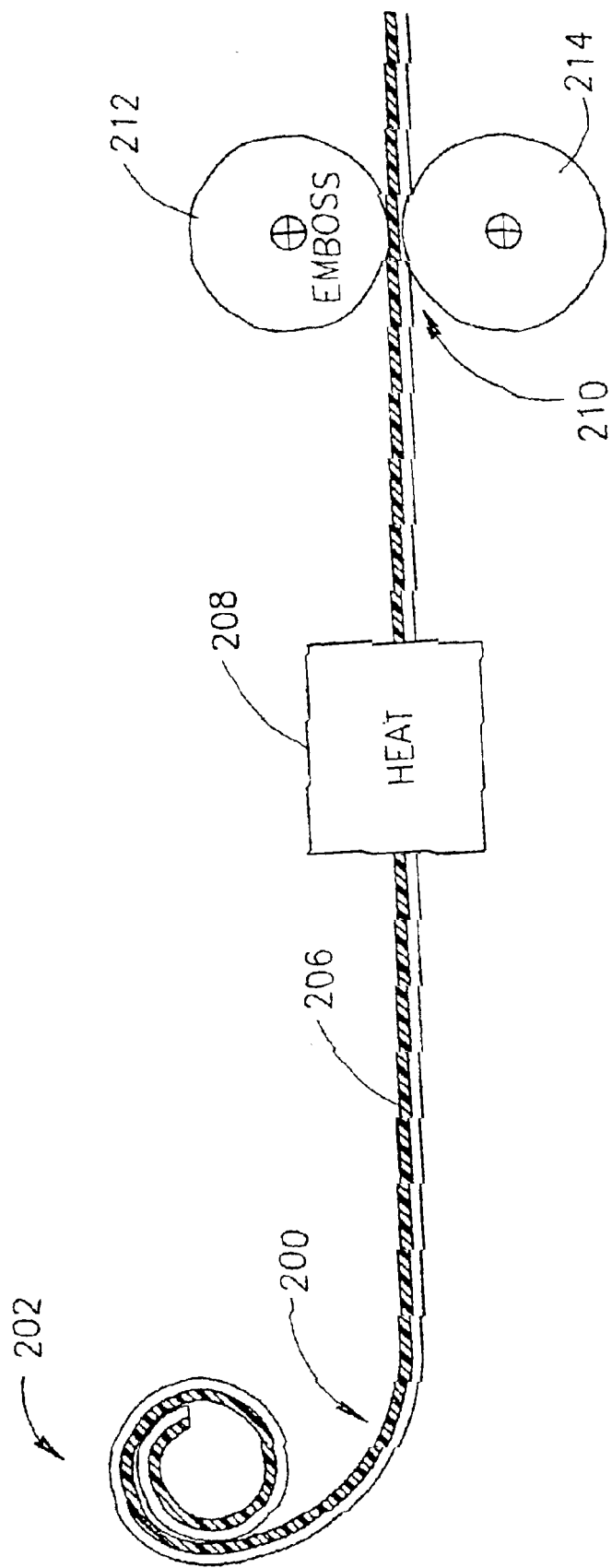
FIGS. 4A–4C schematically show magnified cross sectional views of embossing printed images with hologram patterns, in accordance with preferred embodiments of the present invention.

FIG. 4A schematically shows producing holograms by embossing toner printed on paper in accordance with a preferred embodiment of the present invention. In FIG. 4A a paper web 200 printed with a layer of toner, in accordance with a preferred embodiment of the present invention, is fed from a roll 202 to a heating station 208 at which toner layer 206 is heated so that it is plastic. Web 200 then passes through a nip 210 between an embossing roller 212 and a backing roller 214. Embossing roller 212 is etched with a hologram ridge pattern using methods known in the art. When a region of web 200 passes through nip 210, toner layer 206 is embossed with the hologram ridge pattern. Preferably toner layer 206 comprises thin flakes of reflective material such for example mica or a suitable metal that increase the reflectivity of toner layer 206. To improve fidelity with which the embossing pattern is embossed on toner layer 206, preferably embossing roller 212 is cooled to a temperature substantially less than a temperature at which toner layer 206 becomes plastic.

Figure 4B:
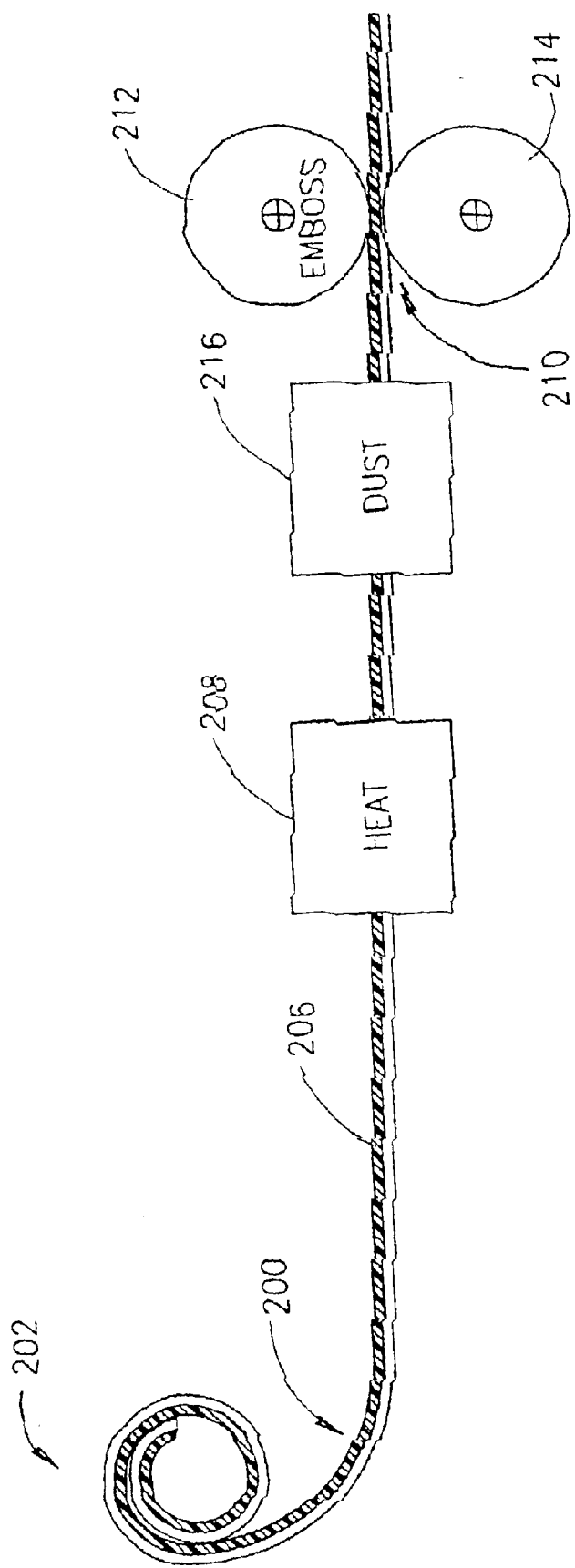

FIG. 4B shows a variation of the method shown in FIG. 4A. In FIG. 4B after being heated at heating station 208 web 200 passes through a dusting station 216. At dusting station 216, toner layer 206 is covered with a dust of reflective material, such for example as a metal dust, using methods known in the art, which increases substantially the reflectivity of toner layer 206. In the method shown in FIG. 4B toner used to produce toner layer 206 may or may not comprises reflective flakes.

Figure 4C:
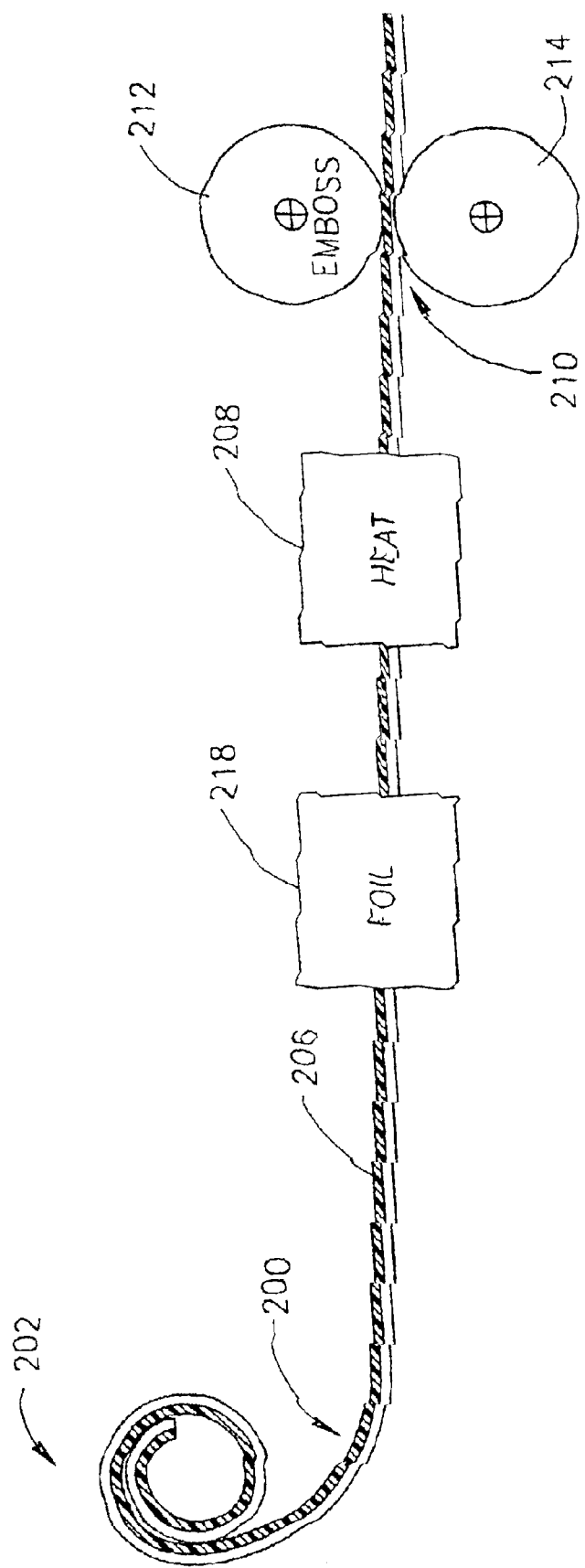

FIG. 4C shows another variation of the method of producing holograms on printed toner, in accordance with a preferred embodiment of the present invention. In FIG. 4C, web 200 passes through a foil printing station 218 at which station toner layer 206 is foil printed using methods known in the art, with a reflective metal foil. Web 200 then passes to heating station 208 where it is heated to a temperature at which foiled toner layer 206 becomes plastic and then continues on to pass through nip 212 where toner layer 206 is embossed. Preferably, toner layer is foiled using processes and material described in PCT Application PCT/IL00/00018 entitled "Foil Printing" which is incorporated herein by reference. Using methods described in the application it is possible to foil either all of toner layer 206 or only desired regions of toner layer 206. After foiling, web 200 undergoes a hologram embossing process in which only areas of the foiled wings are embossed.

It should be noted that, in accordance with a preferred embodiment of the present invention, the substrate may include both image portions and holographic portions (either foiled or unfoiled). In either case, the images have localized regions that are to be embossed with a hologram ridge pattern. Embossing roller 212 has an appropriate region of its surface etched with an embossing pattern. Rotation of embossing roller 212 is synchronized with the rate of advance of web 200 and registered to the images printed on web 200 so that only the localized regions of the images that are intended to have the hologram are properly embossed with the hologram ridge pattern. Whereas in FIGS. 4A–4C a paper web is shown being embossed with a hologram, in some preferred embodiments of the present invention, sheets of paper printed with a toner layer or suitable toner image are embossed with a hologram ridge pattern.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of preferred embodiments thereof that are provided by way of example and are not intended to limit the scope of the invention. The described preferred embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for printing an image on a surface of a substrate having a surface finish defined by a gloss, the method comprising:
    printing an image on the surface of the substrate, such that image areas thereof have a thickness, when fixed to the substrate and dry, of less than a surface roughness of the substrate and less than 6 micrometers, the image comprising a thermoplastic material; and
    smoothing the surface of at least a portion of the thermoplastic material.

2. A method according to claim 1 wherein printed portions of the image have a thickness of less than about 4 micrometers.

3. A method according to claim 1 wherein printed portions of the image have a thickness of less than about 3 micrometers.

4. A method according to claim 1 wherein printed portions of the image have a thickness of less than about 2 micrometers.

5. A method according to claim 1 wherein printing the image comprises printing the image with a liquid toner comprising a colored thermoplastic material in a carrier liquid.

6. A method according to claim 5 wherein the thermoplastic material is colored with a pigment.

7. A method according to claim 6 wherein smoothing comprises;
    heating the image to a temperature at which the thermoplastic material softens; and
    passing the substrate through a nip formed by a smooth hard roller and another surface.

8. A method according to claim 6, wherein the image is substantially free of carrier liquid during said smoothing.

9. A method according to claim 6 wherein smoothing comprises:
    passing the substrate through a nip formed by a smooth hard roller, heated to a temperature at which the substrate softens, and another surface.

10. A method according to claim 6, wherein the thickness of the printed areas of the image is such that only a portion of the surface of the outer surface of the thermoplastic material is situated above peaks of the roughness of the surface of the substrate.

11. A method according to claim 10 wherein the smoothing smoothes substantially only the portion of the surface of the thermoplastic material situated above the peaks.

12. A method according to claim 6 wherein the substrate is paper.

13. A method according to claim 6 wherein the thermoplastic material forms a film prior to the smoothing.

14. A method according to claim 1 wherein smoothing comprises;
    heating the image to a temperature at which the thermoplastic material softens; and
    passing the substrate through a nip formed by a smooth hard roller and another surface.

15. A method according to claim 1, wherein the image is substantially free of carrier liquid during said smoothing.

16. A method according to claim 1 wherein smoothing comprises:
    passing the substrate through a nip formed by a smooth hard roller, heated to a temperature at which the substrate softens, and another surface.

17. A method according to claim 1, wherein the thickness of the printed areas of the image is such that only a portion of the surface of the outer surface of the thermoplastic material is situated above peaks of the roughness of the surface of the substrate.

18. A method according to claim 17 wherein the smoothing smoothes substantially only the portion of the surface of the thermoplastic material situated above the peaks.

19. A method according to claim 1 wherein the substrate is paper.

20. A method according to claim 1 wherein the thermoplastic material forms a film prior to the smoothing.

21. A method for printing an image on a surface of a substrate having a surface finish defined by a gloss, the method comprising:
    printing an image on the surface of the substrate utiling a liquid toner comprising a colored thermoplastic material in a carrier liquid;
    fixing the thermoplastic material to the surface of the substrate; and
    smoothing the surface of at least a portion of the thermoplastic material.

22. A method according to claim 21 wherein the printed areas of the image form a layer of toner thinner than the roughness of the surface of the substrate.

23. A method according to claim 21 wherein the thermoplastic material is colored with a pigment.

24. A method according to claim 21 wherein smoothing comprises:
    heating the image to a temperature at which the thermoplastic material softens; and
    passing the substrate through a nip formed by a smooth hard roller and another surface.

25. A method according to claim 21, wherein the image is substantially free of carrier liquid during said smoothing.

26. A method according to claim 21 wherein smoothing comprises:

passing the substrate through a nip formed by a smooth hard roller, heated to a temperature at which the substrate softens, and another surface.

27. A method according to claim 21, wherein the thickness of the printed areas of the image is such that only a portion of the surface of the outer surface of the thermoplastic material is situated above peaks of the roughness of the surface of the substrate.

28. A method according to claim 27 wherein the smoothing smoothes substantially only the portion of the surface of the thermoplastic material situated above the peaks.

29. A method according to claim 21 wherein the substrate is paper.

30. A method according to claim 21 wherein the thermoplastic material forms a film prior to the smoothing.

31. A method for printing a substantially uniform gloss image on a substrate comprising:

printing an image on a surface of the substrate using pigmented liquid toner that forms a toner layer on regions of the surface on which it is printed; and printing substantially regions of the surface of the substrate that are not printed with portions of the image, with a transparent toner that forms a layer on regions of the surface of the substrate on which the transparent toner is printed.

32. A method according to claim 31 wherein the transparent toner has substantially a same thickness as the pigmented toner.

33. A method according to claim 31 wherein the transparent toner is plastic at substantially the same temperature as the pigmented toner.

34. A method for printing a substantially uniform gloss image on a surface of a substrate using toner comprising:

applying a layer of thermoplastic material to the substrate surface that covers substantially the entire surface of the substrate, which layer is plastic at a temperature at which the toner is plastic;

printing the image on the thermoplastic layer using the toner; and calendering the image at an image temperature at which both the image and thermoplastic layer are plastic.

35. A method according to claim 34 wherein applying a layer of thermoplastic comprises printing a layer of toner of a same type as the toner used to print the image.

36. A method of calendering an image printed on a substrate comprising:

providing a image comprising a thermoplastic colored material, fixed to a substrate and cooled to a temperature below a temperature at which the material is plastic;

heating the image to a temperature at which the material becomes plastic; and passing the image through a nip between a smooth hard roller, at a temperature below that at which the material becomes plastic, and another surface against which the roller is pressed.

37. A method according to claim 36 and including:

continuing contact between the material to the roller after the substrate leaves the nip to allow the material to cool.

38. A method according to claim 36 wherein the material is cooled to a temperature at which it is not plastic prior to its removal from contact with the smooth hard roller.

39. A method according to claim 36 wherein the another surface is the surface of a hard roller.

40. A method according to claim 36 wherein the material comprises a thermoplastic toner material.

* * * * *